(12) United States Patent
Chi et al.

(10) Patent No.: US 7,058,407 B2
(45) Date of Patent: Jun. 6, 2006

(54) ADAPTING A DIVERSITY TRANSMISSION MODE IN A WIRELESS COMMUNICATION SYSTEM

(75) Inventors: Zhijun Chi, N. Richland Hills, TX (US); Mansoor Ahmed, Fort Worth, TX (US); Robert Mark Harrison, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 223 days.

(21) Appl. No.: 10/835,971

(22) Filed: Apr. 30, 2004

(65) Prior Publication Data

US 2004/0229624 A1 Nov. 18, 2004

(51) Int. Cl.
*H04Q 7/20* (2006.01)
(52) U.S. Cl. ............... 455/449; 455/101; 370/329; 370/331; 375/299; 375/347; 375/267
(58) Field of Classification Search ......... 455/449, 455/101, 131, 22; 370/329, 331, 348; 380/28; 375/299, 347, 267
See application file for complete search history.

(56) References Cited

U.S. PATENT DOCUMENTS

| | | | |
|---|---|---|---|
| 6,701,139 B1* | 3/2004 | Kushmaro et al. | 455/131 |
| 2004/0081134 A1* | 4/2004 | Kotzin | 370/348 |
| 2005/0117743 A1* | 6/2005 | Bender et al. | 380/28 |

OTHER PUBLICATIONS

3GPP TSG-RAN 1336, Complexity Aspects of Simulcast Combining for TDD MBMS, Malaga, Spain.Feb. 16-20, 2004, R1-040220.
TSG-RAN Working Group, 1#32 Selective Combing for MBMS, Seoul, South Korea Oct. 6-10, 2003, TSGR1(030).
Ran Working Group 2 Meeting, 340, Signalling for MBMS Simulcast Transmission, Sophia Antipolis, Franc Jan. 12-16, 2004 R2-040132.
TSG-RAN Working Group 2 (Radio Layer 3) Some Consideration on the L2 Desisgn of rth RB Carring MBMS(update) Budapest, Hungary Aug. 25-29, 2003.

* cited by examiner

*Primary Examiner*—Lester G. Kincaid
*Assistant Examiner*—Phuoc Doan
(74) *Attorney, Agent, or Firm*—Frank J. Bogacz

(57) ABSTRACT

A controller (102) in a fixed network of a wireless data communication system (100) transmits an indication that a diversity transmission of the information stream is available. When predetermined capabilities of a user equipment (112) and the fixed network are sufficient to allow soft combining of a primary transmission and the diversity transmission of bits of the information stream in the user equipment, the controller further transmits primary and diversity transmissions in a manner that facilitates soft combining in the user equipment, and transmits a group identity of the information stream to indicate that the information stream is in the primary and diversity transmissions.

33 Claims, 7 Drawing Sheets

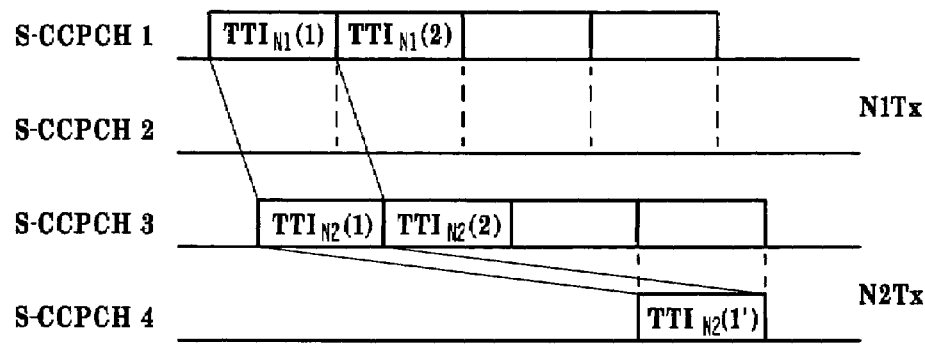
700 FIG. 7
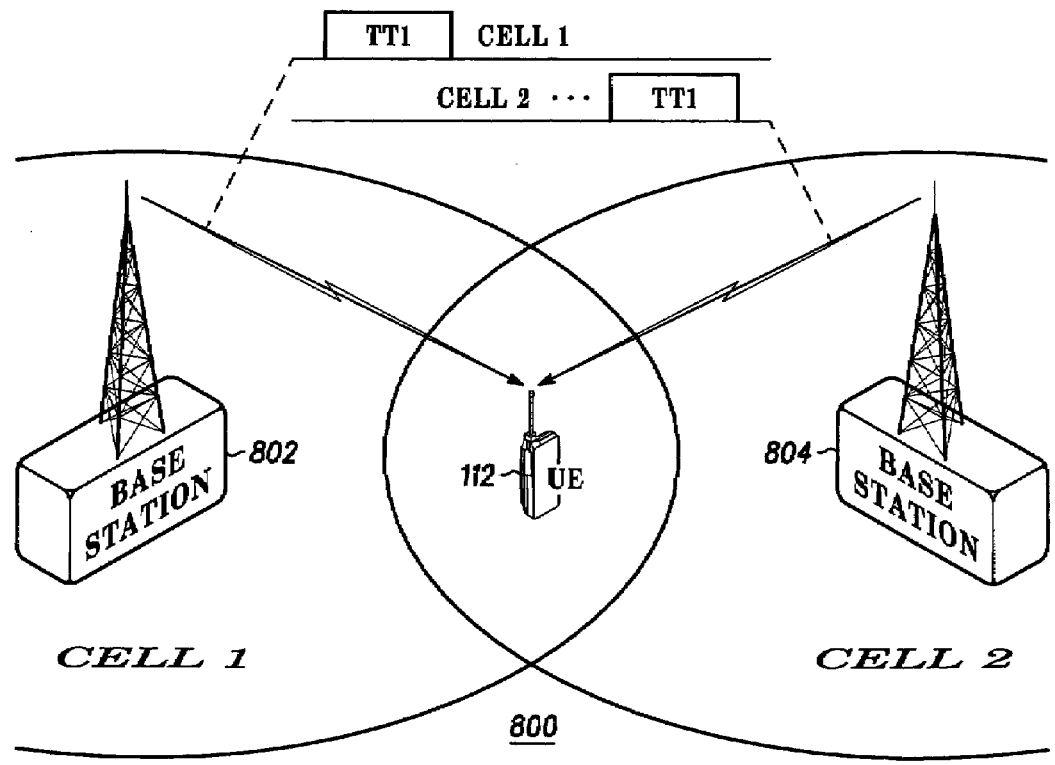
800 FIG. 8

ADAPTING A DIVERSITY TRANSMISSION MODE IN A WIRELESS COMMUNICATION SYSTEM

CROSS REFERENCE TO RELATED APPLICATIONS

The present application is related to co-pending U.S. patent application Ser. No. 10/437,220, titled PHYSICAL RANDOM ACCESS CHANNEL POWER CONTROL METHOD FOR MULTIMEDIA BROADCAST/MULTI-CAST SERVICE, filed May 12, 2003, by CAI Et Al. The co-pending application is assigned to the same assignee as here and is hereby incorporated herein by reference.

FIELD OF THE INVENTION

This invention relates in general to communication systems, and more specifically to an apparatus for adapting a diversity transmission mode in a wireless communication system.

BACKGROUND OF THE INVENTION

It is well known that Multimedia Broadcast/Multicast Service (MBMS) channels require large amounts of power in order to satisfy the Quality of Service (QoS) requirements with adequate coverage. This power requirement can be reduced by using one or more of several known techniques such as power control and diversity. Diversity transmission can be in the form of retransmissions, which provides time diversity, or in the form of spatial diversity such as macro-diversity. Macro-diversity inherently exists in cellular systems when the same MBMS information stream is provided in adjacent cells. However, in order to take advantage of this form of diversity, a mechanism is needed to combine the signals from the diverse transmissions. Prior-art proposals for maximum-ratio combining (MRC) (such as has been done in the well-known rake receiver) and selection combining (SC) exist. The MRC technique is known to provide the best performance but severely constrains the relative transmission delays between the cells. Selection combining, on the other hand, relaxes the delay constraint at the expense of a performance loss (average transmitter power increase on the order of 2 dB for typical conditions).

Thus, what is needed are apparatus and methods for adapting a diversity transmission mode in a wireless communication system. These preferably will match the performance of MRC when possible, and will trade delay constraints for performance gain.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 7 is a timing diagram depicting a retransmission from one cell, specifically corresponding, base station after soft combining has failed.

FIG. 8 is a block diagram depicting near-simultaneous reception from two cells.

DETAILED DESCRIPTION OF THE PREFERRED EMBODIMENTS

Figure 1:
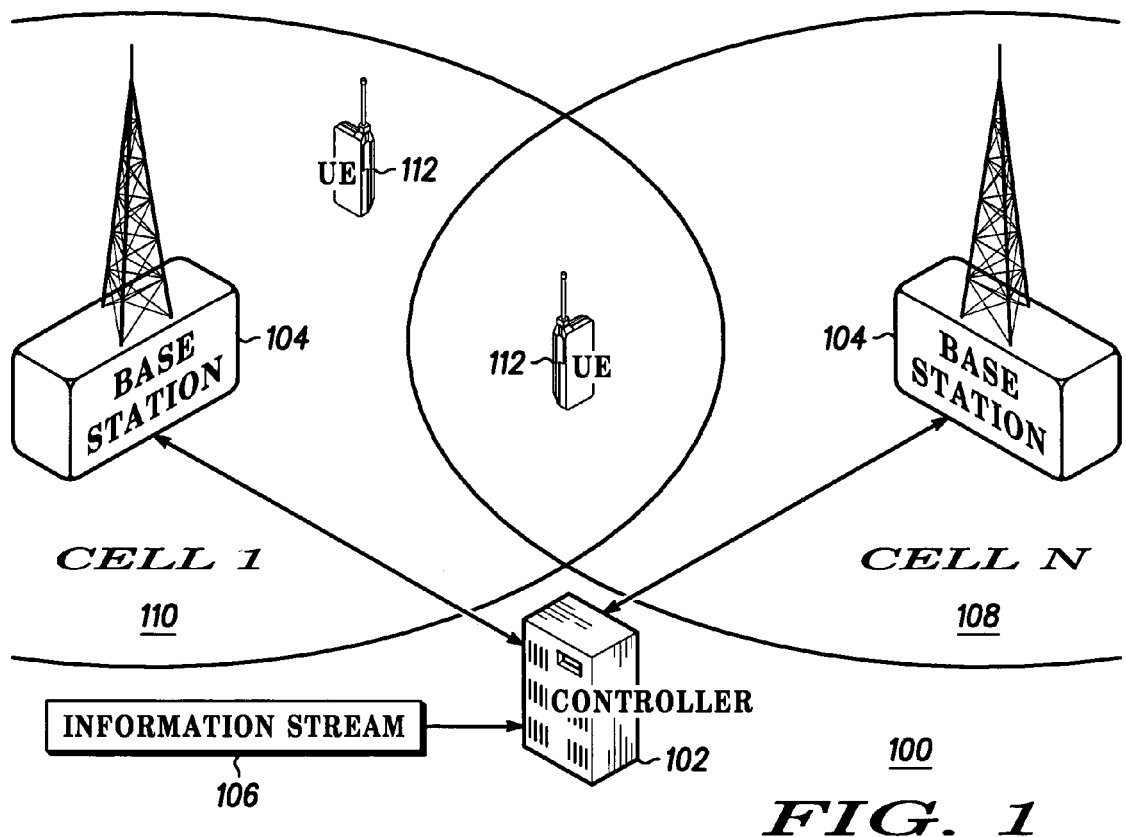
FIG. 1 is an electrical block diagram of an exemplary wireless data communication system.

In overview, the present disclosure concerns communications systems that utilize receivers to provide service for communications units or more specifically a user thereof operating therein. More particularly, various inventive concepts and principles embodied as an apparatus for adapting a diversity transmission mode in a wireless data communication system for use in equipment with such communications systems will be discussed and disclosed. The communications systems of particular interest are those being deployed and developed such as CDMA (Code Division Multiple Access), W-CDMA (Wideband-CDMA), CDMA2000, 2.5 G (Generation), 3G, UMTS (Universal Mobile Telecommunications Services) systems, systems providing MBMS (Multimedia Broadcast/Multicast Service), and evolutions thereof that utilize spread spectrum signals, although the concepts and principles have application in other systems and devices.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the description and discussion of various exemplary embodiments below use terms adopted by the Third Generation Partnership Program (3GPP) specifications. The vocabulary of 3GPP is described in 3GPP TS 21.905, "Technical Specification Group Services and System Aspects; Vocabulary for 3GPP Specifications". Also 3GPP Technical Specification 25.201, "Technical Specification Group Radio Access Network; Physical layer—General description" has an overview of the radio interface protocol architecture useful for understanding the invention.

Much of the inventive functionality and many of the inventive principles are best implemented with or in one or more conventional digital signal processors (DSPs), or with integrated circuits (ICs) such as custom or application specific ICs. It is expected that one of ordinary skill, notwithstanding possibly significant effort and many design choices motivated by, for example, available time, current technology, and economic considerations, when guided by the concepts and principles disclosed herein will be readily capable of programming such DSPs, or generating such ICs with minimal experimentation. Therefore, in the interest of brevity and minimization of any risk of obscuring the principles and concepts according to the present invention, further discussion of such DSPs and ICs, if any, will be limited to the essentials with respect to the principles and concepts employed by the preferred embodiments.

Referring to FIG. 1, an electrical block diagram depicts an exemplary wireless data communication system 100 comprising a fixed network including a controller 102 coupled to a plurality of base stations 104, and a mobile portion comprising a plurality of user equipments (UEs) 112. Each base station 104 provides wireless data communications to UEs within a cell, such as the cells 108, 110. The controller is further coupled to an information stream 106 to enable the communication system to provide point-to-multipoint transmission of packet data derived from the information stream, e.g., a Multimedia Broadcast/Multicast Service (MBMS), as disclosed further herein below.

Figure 2:
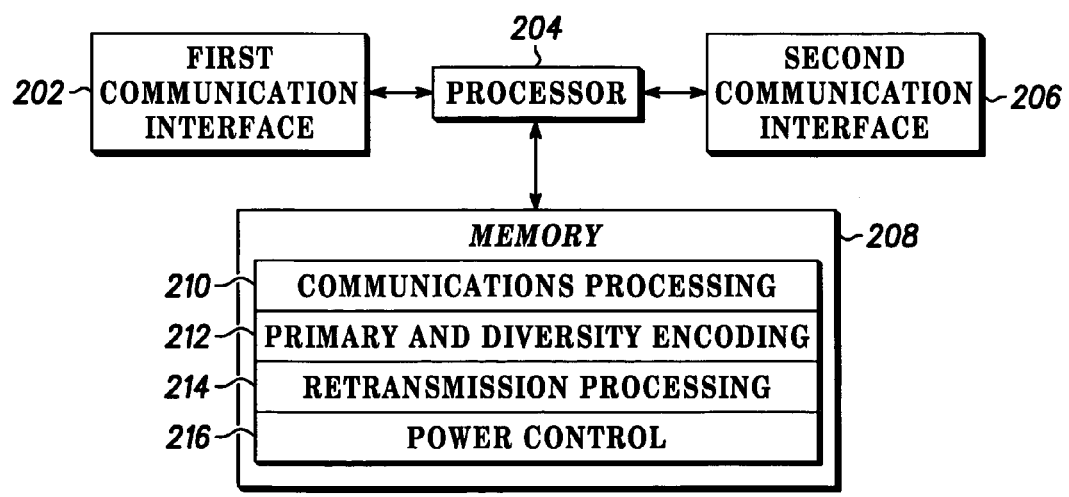
FIG. 2 is an electrical block diagram of an exemplary controller.

FIG. 2 is an electrical block diagram depicting the controller 102, which comprises a first communication interface 202 for receiving the information stream 106. The controller 102 also includes a processor 204 for processing the information stream and for controlling the base stations 104. In addition, the controller 102 preferably includes a second communication interface 206 for communicating with the base stations 104. It will be appreciated that, alternatively, a lesser or greater number of communication interfaces can be utilized for receiving the information stream 106 and for communicating with the base stations 104.

The controller 102 further comprises a memory 208 coupled to the processor 204. The memory 208 includes executable instructions and other data for programming the processor 204 in accordance with the present invention. The memory 208 includes a communications processing program 210 for programming the processor 204 to control the communications with the information stream 106 and with the base stations 104 through well-known techniques. The processor 204 is programmed, for example, to cooperate with the base stations 104 to transmit an indication that a diversity transmission of the information stream is available.

The memory 208 further comprises a primary and diversity encoding program 212 for programming the processor 204 to generate primary and diversity encoded transmissions in accordance with the present invention. When predetermined capabilities of the UE and the fixed network are sufficient to allow soft combining of a primary transmission and a diversity transmission of bits of the information stream in the UE, the processor 204 is preferably programmed to transmit the primary and diversity transmissions in a manner that facilitates soft combining in the UE. This means that the processor 204 in one embodiment is programmed to determine a primary encoded symbol block from a first set of information bits, and a diversity encoded symbol block only from the first set of information bits, wherein the primary encoded symbol block and the diversity encoded symbol block comprise a number of symbols less than a maximum number of symbols in a predetermined time period.

While soft combining will be described in detail below (most particularly with reference to FIG. 9.), it can be differentiated from selection combining in that the received symbols in the primary and diversity transmissions are combined together before decoding, whereas selection combining decodes the branches independently. Generally, selection combining of macro diversity branches for MBMS entails decoding transmissions from multiple cells independently until at least one successfully decodes or until the available macro diversity branches have all been decoded. Selection combining is described in detail in a 3GPP standards contribution by NTT DoCoMo, "Selective Combining for MBMS", 3GPP document R1-031103, TSG RAN1#34, Seoul, South Korea, Oct. 6–10, 2003.

Transmitting a limited number of symbols in a predetermined time period facilitates soft combining because UE 112 has a limited amount of memory. When received symbols are soft combined, they are stored in memory. Therefore, if a number of symbols no greater than the memory of the UE can support arrive in a predetermined time period, the UE can soft combine a transmission whose average data rate is the number of information bits transmitted during the time period. This is described in more detail in the section below, "Adapting Transmission to Support Soft Combining vs. Selection Combining". The processor 204 then transmits the primary and diversity encoded symbol blocks in the primary and diversity transmissions, respectively.

The processor 204 is also programmed to transmit a group identity of the information stream to indicate that the information stream is in the primary and diversity transmissions. A group identity is an indication of the identity of the service carried in information stream 106. For example, in a preferred embodiment intended for the 3GPP standard, the group identity is an indication of the service identity such as the MBMS "Temporary Mobile Group Identity", as described in 3GPP TS 23.246, version 6.2.0, March 2004, "Multimedia Broadcast/Multicast Service (MBMS); Architecture and functional description". Group identities are used because the services are intended for simultaneous reception by multiple users, and therefore the identities must be associated with the service, and not with a given user. Furthermore, the group identities are not simple indications of a channel upon which the information stream 106 and other information streams may be transmitted. The UE must know when the information bits of the information stream are present in order to soft combine, not just that the information stream 106 may be transmitted on a given channel. The processor 204 preferably is further programmed to transmit an indication of the maximum number of symbols to be sent in a predetermined time period and to transmit an indication of a maximum delay between the primary and diversity transmissions. In one embodiment, the processor 204 is programmed to transmit the diversity transmission from a cell different from the cell transmitting the primary transmission.

When the predetermined capabilities of the UE and the fixed network are not sufficient to allow soft combining of the primary and diversity transmissions in the UE, the processor 204 preferably is further programmed to transmit the primary and diversity transmissions in a manner that facilitates selection combining, but not necessarily soft combining, in the UE. In doing this, the processor 204 determines the primary and diversity encoded symbol blocks from the information stream, where the diversity encoded symbol block is allowed to include bits different from those of the primary encoded symbol block; and then transmits the primary and diversity encoded symbol blocks in the primary and diversity transmissions, respectively.

The memory 208 also includes a retransmission processing program 214 for programming the processor 204 to generate a retransmission in accordance with the present invention. More specifically, retransmission processing program 214 programs the processor 204 to transmit or retransmit the diversity transmission in response to receiving a group negative acknowledgement from at least one UE. A group negative acknowledgement is a negative acknowledgement transmitted by one or more UEs that indicates that the one or more UEs did not correctly decode a particular transmission, and thus is requesting a retransmission. The particular transmission is a single block of information bits being simultaneously received by all UEs. Furthermore, the group negative acknowledgement is a retransmission request for a particular information block of information stream 106, and is therefore associated with the group identity of the service. The group negative acknowledgements are not simple retransmission requests for a channel upon which the information stream 106 and other information streams may be transmitted. The network must know which information streams to retransmit, not just that a retransmission of a given channel is desired. In addition, the processor 204 preferably is programmed to transmit the diversity transmission during a predetermined time interval known to both the UE and the fixed network. In addition, the memory 208 includes a power control program 216 for programming the processor 204 to control the power of the base stations 104 in accordance with the present invention. More specifically, the processor 204 is programmed to adjust a transmit power of at least one of the primary transmission and the diversity transmission in response to receiving a group negative acknowledgement (NAK). In addition, the processor 204 is programmed to identify from the group NAK a cell for which the group NAK is intended.

In one embodiment, the processor 204 is programmed to determine a primary and a diversity encoded symbol block from an information block of the information stream, transmit the primary encoded symbol block on a primary channel, and transmit the diversity encoded symbol block on a diversity channel in response to receiving a group negative acknowledgement (NAK) from at least one user equipment (UE). In this embodiment, the processor 204 is further programmed to transmit the diversity encoded symbol block during a predetermined time interval known to both the UE and the fixed network. The processor 204 is further programmed to adjust a transmit power of at least one of the primary channel and the diversity channel in response to receiving a group negative acknowledgement (NAK) from at least one UE. The processor 204 is further programmed to transmit an indication of a maximum number of symbols to be transmitted in the diversity transmission. In addition, the processor 204 is programmed to transmit a group identity of the primary and diversity channels. The processor 204 is further programmed to select a maximum number of symbols to be sent on the diversity transmission in a predetermined time period, and to determine information bits in the primary and diversity encoded symbol blocks, using identical information bits from the information stream, wherein the information stream has an identity. The processor 204 is also programmed to ensure that the diversity transmission contains no more than the maximum number of symbols; and to transmit the identity of the information stream on the primary and diversity channels. These and other aspects of the present invention are disclosed in further detail herein below. It will be appreciated that, alternatively, some of the functionality described herein above as taking place in the controller 102 can be moved into the base stations 104 instead as a matter of design choice.

Figure 3:
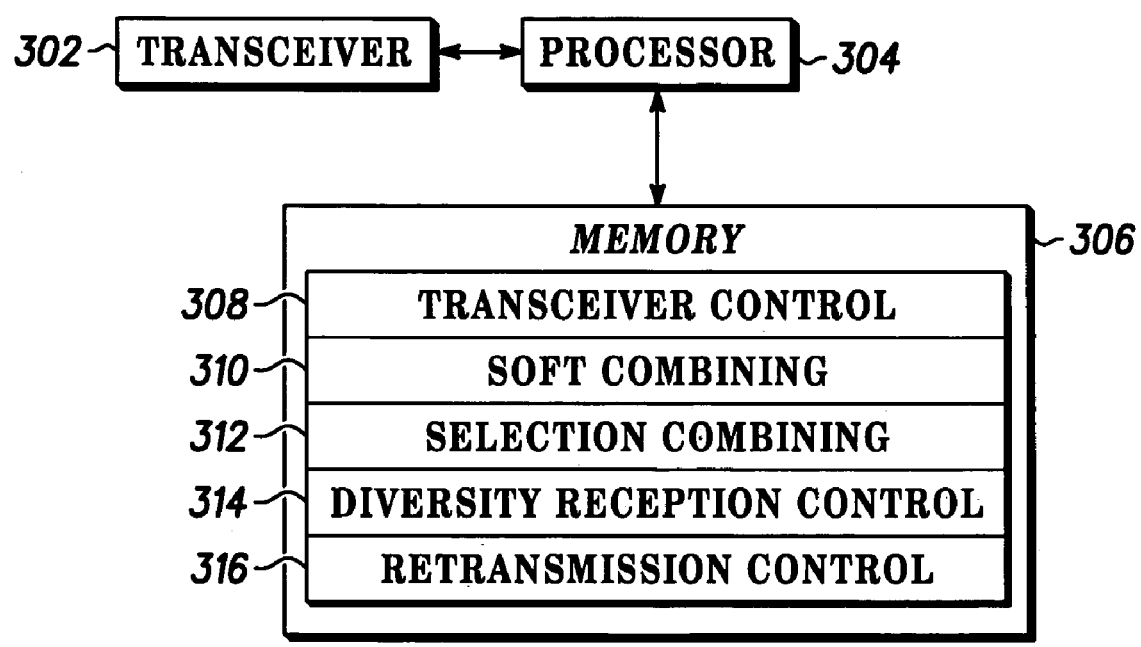
FIG. 3 is an electrical block diagram of an exemplary user equipment.

FIG. 3 is an electrical block diagram of the UE 112, comprising a transceiver 302 for communicating with the fixed network. The UE 112 further comprises a processor 304 coupled to the transceiver 302 for controlling the transceiver in accordance with the present invention. The UE also includes a memory 306 coupled to the processor 304. The memory 306 includes executable instructions and other data for programming the processor 304 in accordance with the present invention. The memory 306 comprises a transceiver control program 308 for programming the processor 304 to control the transceiver 302 in accordance with the present invention. The memory 306 also includes a soft combining program for programming the processor 304 to perform soft combining of received primary and diversity transmissions. In addition, the memory 306 includes a selection combining program 312 for programming the processor 304 to perform selection combining of received primary and diversity transmissions. The memory 306 further comprises a diversity reception control program 314 for programming the processor 304 to cooperate with the fixed network to control the reception of a diversity transmission from the fixed network. In addition, the memory 306 comprises a retransmission control program 316 for programming the processor 304 to request a retransmission in accordance with the present invention.

More specifically, the processor 304 is programmed to cooperate with the transceiver 302 to receive a group identity of the information stream. When the fixed network encodes a primary symbol block in a primary transmission from a first set of information bits and also encodes a diversity symbol block in a diversity transmission from the first set of information bits, wherein the diversity symbol block comprises a number of symbols less than a predetermined maximum number of symbols in a predetermined time period, the processor 304 is further programmed to receive, combine, and decode the primary and diversity symbol blocks to produce a decoded received information block, preferably through the soft combining technique of FIG. 9.

When the fixed network performs one of: (a) transmitting a number of symbols greater than the predetermined maximum number of symbols in the diversity symbol block in the predetermined time period, and (b) determining the primary transmission at least in part from a second set of information bits different from the first set, the processor 304 is further programmed to receive, select, and decode the primary and diversity symbol blocks to produce a decoded received information block through a well-known selection combining technique.

In one embodiment, the processor 304 is further programmed to receive the group identity of the information stream concurrently with the primary transmission and with the diversity transmission to produce a dynamic identity indication. In another embodiment, the processor 304 is further programmed to receive the group identity of the information stream separately from the primary and diversity transmissions to produce a static indication of identity.

In addition, the processor 304 is programmed to receive the primary and diversity transmissions from a first cell and a second cell, respectively, and to receive the primary and diversity transmissions at first and second time intervals. The processor 304 is further programmed to receive an indication from the fixed network that the primary and diversity transmissions will be transmitted to facilitate combining of the primary and diversity transmissions, and is further programmed to receive a message from the fixed network that indicates an amount of delay between the primary and diversity transmissions. In another embodiment, the processor 304 is further programmed to determine a delay between the primary and diversity transmissions.

In yet another embodiment, the processor 304 is programmed to cooperate with the transceiver 302 to receive an indication that a diversity transmission of the information stream is available, and thereafter to receive a primary transmission on a primary channel. The processor 304 is further programmed to transmit a group negative acknowledgement (NAK) at a predetermined time on a predetermined reverse channel, e.g. a channel transmitted from the UE to the fixed network, in response to receiving the primary transmission; and thereafter to receive the diversity transmission on a predetermined diversity channel.

The processor 304 is further programmed to receive the diversity transmission during a predetermined time interval known to both the UE and the fixed network, and to receive the primary and diversity channels during first and second time intervals from a first cell, and to receive a second diversity channel from a second cell. The processor 304 is further programmed to transmit the NAK upon a physical random access channel (PRACH).

In one embodiment, the primary channel is transmitted from a first cell, and the diversity channel can be transmitted from one of the first cell and a second cell. In this embodiment, the processor 304 is further programmed to selectively encode the NAK for reception by one of the first and second cells. In addition, the processor 304 is further programmed to selectively encode the NAK in response to a first and a second measurement of signal power, the first measurement made on the first cell, and the second measurement made on the second cell. These and other aspects of the present invention are disclosed in greater detail herein below.

Figure 4:
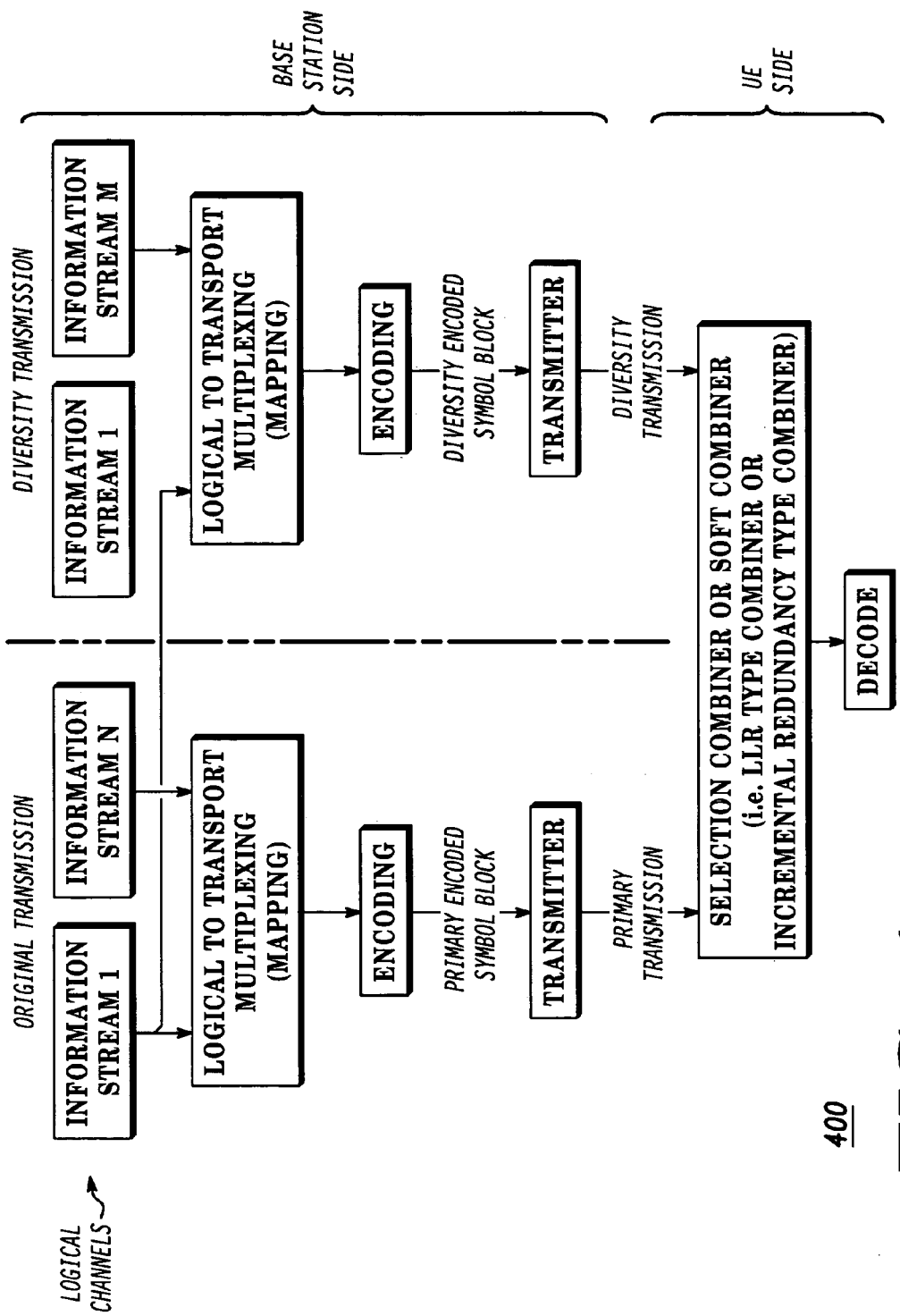
FIG. 4 is a block diagram defining aspects of primary and diversity transmission.

FIG. 4 depicts a block diagram 400 defining aspects of primary and diversity transmission. On the left side of the diagram 400, elements of the original, or primary, transmission branch are depicted. The right side of the diagram 400 depicts elements of the diversity transmission branch. The diversity transmission can be a second transmission sent from the same base station that sent the primary transmission, or can be a macro-diversity transmission sent from a base station different from that which sent the primary transmission, depending on the capabilities of the wireless communication system. Note that in order for the UE to soft combine the primary and diversity transmissions, the data at the outputs of the Logical to Transport Multiplexing elements of each branch must be identical. Otherwise, the UE will use selection combining to combine the primary and diversity transmissions.

In essence, what is disclosed is an adaptive transmission from one or more cells in MBMS point-to-multipoint mode, in which a single transmission is intended for reception by multiple users. The primary and diversity transmissions can be created through macro diversity transmission on multiple cells or by time diversity through retransmission at multiple times. The subscriber terminal (UE 112) can combine these transmissions through one of two approaches. The first approach is a soft-information combining scheme, which preferably combines a priori log likelihood ratio (LLR) information, or, equivalently, the associated a priori probabilities. Soft (LLR) combining is described further herein below. This scheme provides the same performance as maximal ratio combining (MRC) but without the severe relative transmission delay constraints. The second approach is selection combining, which can be supported in the UEs 112 with limited memory, but provides no soft combining gain. The fixed network adapts the transmission based on the ability of the UEs to combine transmissions, and on the network's ability to synchronize the primary and diversity transmissions, or by responding to retransmission requests from the UE. The transmission and reception aspects of the proposed mechanisms are described herein below.

Adapting Transmission to Support Soft Combining vs. Selection Combining:

UEs have limited soft buffer memory in their turbo decoders to store LLR information or other soft metric information indicative of the probability that a given channel symbol was transmitted. Therefore, LLR combining can only be performed when the number of symbols to be combined is less than the soft buffer available in the UE. However, the UE is not aware if the network will meet its buffer requirements unless it is assured this is the case through performance requirements or explicit signaling.

A second requirement for LLR combining at the UE is that the encoded bits transmitted in the primary and diversity transmissions are derived from the same information bits from the information stream of interest. Note that LLR combining is still possible if different encoded bits are transmitted, for example as done in systems using hybrid ARQ for incremental redundancy. Also, all information bits on the diversity branches need not be identical for LLR combining of the information stream of interest to be combined. The encoded bits derived from different information bits can be excluded from the combining operation.

A third (closely related to the second) requirement for LLR combining at the UE is that the UE can determine that the information stream of interest is present at a given point in time on a given physical channel. If it doesn't know the information stream is present, it can't combine the soft information from a diversity branch with another branch. While the UE could decode with the diversity branches both combined and uncombined and then select a result that correctly decodes, this could waste memory, receiver resources, and decoder computation. It is better for the network to signal when the information stream of interest is present on a diversity branch. It is thus preferred that the controller 102 transmit a group identity specifically identifying the information stream to indicate that the information stream is in the primary and diversity transmissions. The group identifier is preferably transmitted concurrently with the first encoded symbol block of the information stream to produce a dynamic identity indication. In 3GPP, the group identifier can be sent, for example, in the transport format combination indicator (TFCI). This is described in more detail in the section "Information Block Identification" below. Alternatively, the group identifier can be transmitted separately from the first encoded symbol block of the information stream to produce a static indication of identity. When transmitted separately, the first encoded symbol block can, for example, be transmitted in predetermined fixed positions within the transmission. The network indicates that the information present at the fixed positions is information stream 106 using the group identity.

Since there is a need for both selection and LLR combining, the network must adapt the transmission to support either mode. This adaptation principally takes the form of selecting a number of symbols on a diversity transmission in a predetermined time period to match UE memory and network synchronization capabilities, and selectively transmitting information from bits from one information stream to enable LLR combining where it can be supported in the network and UE. Signaling to support this adaptation is described in more detail herein below.

Feedback Based Diversity Retransmission with Delay Constraints:

This method essentially comprises a group negative acknowledgement (NAK) mechanism with retransmissions in response to the group NAKs. At a predetermined time, UEs that are unable to successfully decode a received information block send a NAK to request a retransmission. In 3GPP systems, the NAK may be signaled using a pre-reserved physical random access channel (PRACH) time slot and spreading code. In a preferred embodiment, the group NAK is specific to a particular MBMS service: the reserved PRACH time slot and spreading code combination is associated with a particular MBMS service identity. This allows the fixed network to know which information stream requires retransmission. When there is a large number of active services, it is advantageous in an alternate embodiment to associate a NAK with multiple service identities, such that the NAK is a request for all of the services associated with the NAK. In this way, a single group NAK is assigned for multiple services, and since the received power of the NAKs combine at the cells, the total power required can be lower when the NAK refers to multiple service identities. The signaling itself is an ON-OFF-Keying mechanism wherein the presence of a signal in the preserved slot indicates a NAK and the absence of the signal implies an ACK. This technique is similar to the PRACH based power control mechanism disclosed in U.S. patent application Ser. No. 10/437,220, filed May 12, 2003, by Cai et al., which is hereby incorporated herein by reference. The scheme essentially reserves an uplink channel (preamble and slot) specifically for feedback. Note that the uplink access method involves 16 code channels (preambles) and on each of these channels there are 12 slots. For the purpose of NAKing, one of the slots in one of the channels may be reserved. This contributes to only a small fraction of the uplink load. It is possible to request retransmissions from one cell only or from one of multiple cells using signaling based on the PRACH. We first consider retransmission from one cell.

UEs have limited receiver resources as well as the memory limits discussed above. Therefore, the network should retransmit in such a way as to make efficient use of UE resources as well as network resources. If retransmissions are transmitted at a delay relative to the original transmission that is known to the UE, the UE can receive the channel containing the retransmission at the appropriate time, minimizing receiver and memory resource requirements. Transmitting at a known delay to the UE also allows the UE to measure the propagation channel as near as possible to when the retransmission could be sent, allowing it to decide if the channel is of sufficient quality to justify the retransmission. (Note that the measurement of propagation channel strength can be made by calculating the received power of a common pilot channel {CPICH}).

Constraining the delay between the diversity branches also improves efficiency of MBMS point to multipoint mode by allowing the retransmissions and feedback to be combined together in time. If the retransmissions have unconstrained delay, then they can occur at multiple times, and if more than one request were received, more than one retransmission containing the same information could be made, wasting forward link power and bandwidth. Similarly, on the reverse link, constraining the UEs to transmit NAKs at particular times makes it more likely that the base station will receive a NAK correctly, since the power of the NAKs combines.

Figure 5:
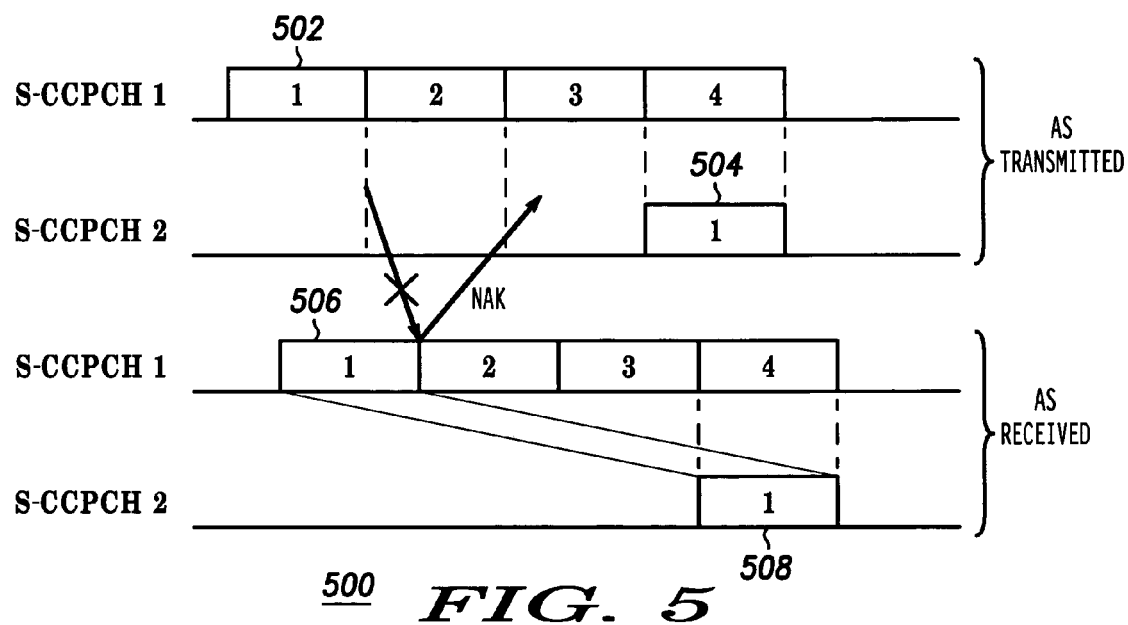
FIG. 5 is a timing diagram depicting a retransmission scheme for MBMS.

As indicated above, the diversity transmissions may be from different bases as well as at different times. Cell specific NAKs are used so that the retransmission requests can be made to one cell at a time. Furthermore, the NAKs are implicitly for a particular information block due to the fixed timing relationship to its first transmission (within a margin of error to account for propagation delay). The cell that receives a NAK destined for it then retransmits the designated information block after a fixed predetermined delay on a different channel (e.g., a different physical or transport channel designated for retransmissions only). Here, we use the $3^{rd}$ Generation Partnership Project (3GPP) definition of physical and transport channels. Note that the 3GPP Technical Specification 25.201, "Technical Specification Group Radio Access Network; Physical layer—General description" describes the relationship of these channels. FIG. 5 depicts the implementation 500. Note that the base station sends a primary transmission 502 that results in a received primary transmission 506 containing errors at the UE. In response, the UE returns a NAK to the base station. This results in a retransmission 504 from the base station. The retransmission is received by the UE producing a received retransmission 508.

Note that the transmissions from multiple cells may be unsynchronized. This requires certain special procedures for both the cell and UE, which are described further herein below. In general, when multiple cells are involved, the delay difference between the transmissions is communicated to the UE (assuming that the delay jitter is small).

The NAKs do not identify the frames specifically. Thus the identity of the frame that requires retransmission is determined through preset timing relations. Furthermore, when multiple UEs request a retransmission for the same frame, they all transmit the same preamble at the same time. These preambles arrive at the base station within a short duration of each other and hence their power can combine to provide more reliable reception of the NAK.

Combined Macro and Time Diversity Transmissions:

Both time and macro diversity can be offered simultaneously. As we discussed above, LLR combining of diversity branches provides the best performance, but is more demanding in terms of UE memory resource and network synchronization. Therefore, the UE receiver behavior is dependent on whether the cells it receives diversity transmissions from are synchronized well enough such that the primary transmissions from the cells arrive before the retransmissions.

We first consider when the cells are not well synchronized. In this case, the UE requests retransmissions from the strongest cell by measuring the common pilot channel (CPICH) power received from the cells, and designating the NAK to the appropriate cell. For instance, consider a situation with two cells. When the UE receives the n-th information block from cell 1, and it fails to decode the block successfully, it measures the received power of the CPICH from the two cells and if the CPICH power of cell 1 is greater than CPICH power of cell 2 (plus a margin), a NAK for cell 1 is generated, otherwise, the UE waits for the same information block from cell 2. If a NAK is transmitted to the first cell, the retransmission is LLR combined with the primary transmission if the UE has sufficient memory, otherwise the first transmission is discarded and the UE must decode using the retransmission. When the second cell's primary transmission arrives, the UE will again attempt to decode it, and will either use LLR combining or selection depending on its memory resources. If the combination of the two information blocks from the two cells fails to successfully decode a NAK for cell 2 is generated.

If the primary transmissions are close enough together in time, the UE will have sufficient soft buffer memory to combine the transmissions from the cells before the retransmissions would (potentially) be transmitted. In this case, the UE first combines the cells before sending a NAK. A NAK is generated if the combined reception fails to decode successfully, and is directed to the cell with the higher CPICH power. Then the retransmitted information block is combined with the previously combined soft-information and decoded again.

Additional details on operation with combined macro and time diversity (for both the synchronized and unsynchronized scenarios) are provided below.

Power Control:

In order for the UE to combine the retransmission with the original transmission, the power levels must be the same, or if they are different then the UE must know the power levels. If the power levels are significantly different, and the UE cannot determine the power levels, then the UE will not be able to combine based on the received power, and could emphasize a weak diversity branch, degrading reception performance. Furthermore, a retransmission caused by a particular UE should not degrade the MBMS reception of other UEs. Thus the channel carrying the first transmission must always transmit at the same (or at least a slowly varying) power level. A slow power control method is employed here. The power control procedure is based on the NAK feedback.

Several alternatives can be used here: a) the transmission power of the base station is gradually reduced in a very slow manner; but whenever a NAK is received, the power is increased by a certain amount; b) The transmission power of the base station is decided by the number of NAKs received in a pre-defined window. If the number is larger than a threshold, the power will be increased; otherwise, the power will be reduced. Other alternatives for slow power control based on NAK feedback are also possible. Note that power control is done in response to the NAK indications themselves, and not to the power level at which the NAKs are received. The received NAK power level can vary such that it is a poor indication of the required power for the MBMS transmission. For example, the number of UEs transmitting the group NAK simultaneously may vary, causing the total received NAK power level to vary. Furthermore, the group NAKs may not be well power controlled, adding variation to their received power level.

Signaling of Diversity Reception Modes:

Networks supporting MBMS may support at least selection combining of diversity transmissions, and so some signaling will already be needed to indicate that diversity transmissions are available for a given MBMS information stream. The additional signaling needed to support soft combining (i.e., so that the UE can allocate receiver resources) then is an indication to the UE that the same information bits of the information stream of interest are available on the diversity branches, and that its soft buffer requirements will not be exceeded.

The information indicating that the same information stream is available preferably is a message mapping the information stream to a physical or logical channel. (This message can be transmitted slowly through configuration messages, or more quickly through physical layer signaling, such as the transport format combination indicator {TFCI} signaling available in the 3GPP standard.) Macro diversity and time diversity signaling is different, in that there can be many cells, but only a few retransmissions at fixed delays. Therefore, in the retransmission case, the number of retransmissions would be signaled, or a fixed predetermined number known to both base and mobile would be used. In the macro diversity case, the presence of the information stream on a given cell needs to be signaled for each cell. This signaling information can be transmitted on each cell (i.e., cells transmit information about their neighbor cells), or the information streams present on a given cell can be transmitted only on that cell (i.e., no neighbor cells information). In the first case, UEs need to read information from one serving cell, while in the second case less information is transmitted to conserve air interface capacity.

The indication that the soft buffer requirements will not be exceeded preferably is a message containing the maximum number of information and diversity channel symbols the network will transmit on all diversity branches and a UE is expected to receive in a given time period. In the macro diversity case, the maximum number of channel symbols the UE can combine in the worst case is constrained by the maximum delay between the cells that the UE can receive. In this case, the message would reflect the maximum number of channel symbols the network will transmit on the N macro diversity branches with the greatest delays from the earliest macro diversity branch transmission. Here, N is a maximum number of diversity branches the UE is expected to receive, and is known to both the UE and the network. In this way, all UEs can be guaranteed to be able to soft combine any macro diversity branches (up to its maximum number) of a given MBMS service that are at sufficient power to receive. In a preferred embodiment, the maximum number of channel symbols the UE will transmit (counting the symbols on the diversity branches with greatest delay) is quantized, such that the number can be selected from a list of the maximum number of channel symbols. This list is known to both the network and the UE. Alternatively, the indication could also be a message indicating that soft combining of the diversity transmissions is possible, that is, the network will transmit no more than a predetermined maximum number of information and diversity channel symbols in a predetermined time period on the N macro diversity branches, including the N−1 branches with greatest delay with respect to the earliest macro diversity branch transmission.

We consider an example for clarity. When two cells provide only macro diversity, if the transmission timing difference between cell 1 and cell 2 is on the order of a few information blocks, cell 1 may signal to the UE that log-likelihood soft combining can be applied to the signal from cell 2. In this case, since the maximum number of information bits is not signaled, the UE will know in advance that the network will transmit no more information bits on the two cells than the UE can store in its soft buffer memory based on the data rate of the MBMS service. However, if the transmission timing difference between the cell 1 and cell 2 is large, many UEs would not be able to soft combine the diversity transmissions from the cells, and cell 1 will signal to the UE that the selection combining should be applied to the signal from cell 2. Signaling that selection combining should be applied indicates to the UE that the same information content is available on the cells, but that the network cannot guarantee that the information will be well synchronized. Finally, if there are too few UEs wishing to receive the information stream in either or both of the cells, there would be no benefit to diverse transmission. In this case, the cell would signal to the UEs that no diversity transmission is enabled.

Some embodiments use automatic repeat request (ARQ) techniques for MBMS, which can be designated as MBMS-ARQ (MARQ). The basic idea is to employ a common uplink (UL) signaling scheme based on shared reverse link channels, such as the PRACH to notify the base station (node B) of a repeat request. Each UE transmits a pre-reserved PRACH preamble in a pre-reserved slot when it needs a retransmission and does not transmit anything when the received frame is correct, thereby implementing a "group NAK" ARQ mechanism. Obviously, NAKs from multiple UEs appear as multipath components at the base station where their power can be combined to produce a more reliable NAK indication.

As mentioned previously, the idea is to have UEs that require a retransmission (i.e., when an MBMS transmission fails to decode) to transmit a NAK using a PRACH preamble. The base station then retransmits the frame.

The following sections describe the details of the aforementioned timing relations and the retransmission mechanisms.

Physical Channel Structure:

It is desirable for MBMS to provide a constant throughput to all UEs in the coverage region. If a constant rate is not possible, it is still conceivable to design a system wherein the minimum effective rate is equal to the designed rate. That is, in order to support a re-transmission scheme, a link must provide a throughput that is higher than the desired rate by a factor that is essential to support a maximum number of re-transmissions. Another important criterion is that the delay jitter of UEs in good signal to noise ratio (SNR) locations (e.g. close to cell sites) must be unaffected by retransmission requests made by UEs in bad SNR locations. Thus an embodiment that multiplexes the primary transmission onto a first, "primary channel", and the retransmitted data onto a second, "diversity channel" can be used. The channels may be physical code channels or transport channels. Using a second channel for retransmissions solves the above problems, as it does not affect the UEs in good SNR locations that only receive the primary channel, reduces the delay jitter on the primary channel, and controls the peak data rate of that channel. Note that this use of primary and diversity channels is also used for the macro diversity case. For macro diversity, a primary channel is a channel transmitted on a first cell, and a diversity channel is a channel transmitted on a second cell.

Time multiplexing (of transport channels) on a single physical channel induces delay jitter to all UEs when even a single UE is in a bad SNR location and requesting retransmissions. Also, if a single code channel is heavily multiplexed, then UEs with low capability may not be able to decode it (due to the peak data rate constraints or limited number of transport format combinations). Thus a diversity channel carrying a retransmission is preferably a second physical channel rather than a transport channel. While 3GPP does code multiplex channels, the number of orthogonal variable spreading factor (OVSF) codes a given UE can receive is limited for non-high-speed downlink packet access (non-HSDPA) channels. We therefore try to use as small a number of additional physical channels for the retransmissions as possible.

Implementation example of MARQ Process with retransmission on second physical Channel:

Assume that the primary transmission is on a first physical channel designated Secondary-Common Control Channel 1 (S-CCPCH 1) and the retransmission is on a second physical channel designated Secondary-Common Control Channel 2 (S-CCPCH 2). In a synchronized retransmission scheme, the UE must follow a series of logical steps before combining the symbols from S-CCPCH 2 with the symbols from S-CCPCH 1. Firstly, the UE must know when retransmissions occur (if they occur). In the example in FIG. 5, the retransmissions occur three transmission time intervals (TTIs) later. Thus, each UE in the cell that failed to decode the first transmission will transmit the NAK to the Node B, and then demodulate and despread S-CCPCH 2 after three TTIs and combine with the data in its buffer. Other UEs that successfully decoded the first transmission need not combine; therefore, UEs close to node B will not receive S-CCPCH 2, thereby conserving some energy. Although multiple retransmissions are possible, given the increased system complexity (sequence numbering may be required; NAK should carry more information; additional DL resources; additional preambles allocated; etc.) a maximum number of retransmissions, such as one retransmission may be appropriate.

Macro Diversity Support with Retransmission:

There exist several proposals for macro-diversity in MBMS. All these methods employ transmissions of a service from multiple cells or base stations. The method disclosed here extends these mechanisms to employ a NAK based retransmission scheme so that the UE can request retransmissions from one of the serving base stations or corresponding cells.

The retransmission scheme described in previous sections is combined with the macro-diversity (selection and soft combining). The following section presents the specific methods. It will be appreciated that, while the methods can be performed by the example apparatus depicted in FIGS. 1 through 3, the methods can be applied to and performed by other similar apparatus as well.

In this section we present the methods employed at the UE and base station to support macro-diversity in the context of MARQ. Without loss of generality we assume two-way macro-diversity transmission. Two cases are possible; (1) When the transmissions from the cells are not synchronized well; and (2) When the transmissions from the cells are well synchronized.

Case 1:

First we assume that the transmissions are not synchronized well, and the transmissions from base station or cell 1 (N1) arrive at the UE earlier and transmissions from base station or cell 2 (N2) arrive an arbitrary number of TTIs later. Hence only selection combining is possible between two different cells. We denote the transmission during the "n-th" TTI for the service from N1 and N2 as $TTI_{N1}(n)$ and $TTI_{N2}(n)$, respectively. Also, the retransmissions of the data in the TTIs (if any) are denoted as $TTI_{N1}(n')$ and $TTI_{N2}(n')$. As mentioned previously a retransmission occurs after a fixed delay on another Secondary-Common Control Channel (S-CCPCH). The following sequence of operations by the UE can be used for receiving the n-th TTI. In the method below, Δ represents a hysteresis between cells to allow for maximum diversity benefit depending on mobile speed.

UE Method:

Step A: Receive $TTI_{N1}(n)$

Step B: If Cyclic Redundancy Check (CRC) of $TTI_{N1}(N)$ fails

```
    Measure Common Pilot Channel (CPICH) of N1 and N2 (denoted as
CPICH_N1 and CPICH_N2)
        If CPICH_N1 > CPICH_N2 + Δ
            Transmit NAK for N1
        Else
            Goto Step F
        End
    Else
        Goto Step J
    End
```

Step C: Receive $TTI_{N1}(n')$

Step D: Soft Combine $TTI_{N1}(n)+TTI_{N1}(n')$ and decode

Step E: If CRC of $TTI_{N1}(n)+TTI_{N1}(n')$ fails

```
            Goto Step F
        Else
            Goto Step J
        End
```

Step F: Receive $TTI_{N2}(n)$

Step G: If CRC of $TTI_{N2}(n)$ fails

```
            Transmit NAK for N2
        Else
            Goto Step J
        End
```

Step H: Receive $TTI_{N2}(n')$

Step I: Soft Combine $TTI_{N2}(n)+TTI_{N2}(n')$ and decode

Step J: Increment n (i.e. prepare to receive next TTI)

The base station must respond as follows:

Base Station (Node B) Method:
  If N1 receives NAK then it must retransmit $TTI_{N1}$ after a fixed delay on the S-CCPCH reserved for retransmissions
  If N2 receives NAK then it must retransmit $TTI_{N2}$ after a fixed delay on the S-CCPCH reserved for retransmissions The above steps elucidate the fact that soft combining (LLR combining) is used to combine the retransmission from the same cell with the original transmission from that cell but selection diversity is employed between cells.

Figure 6:
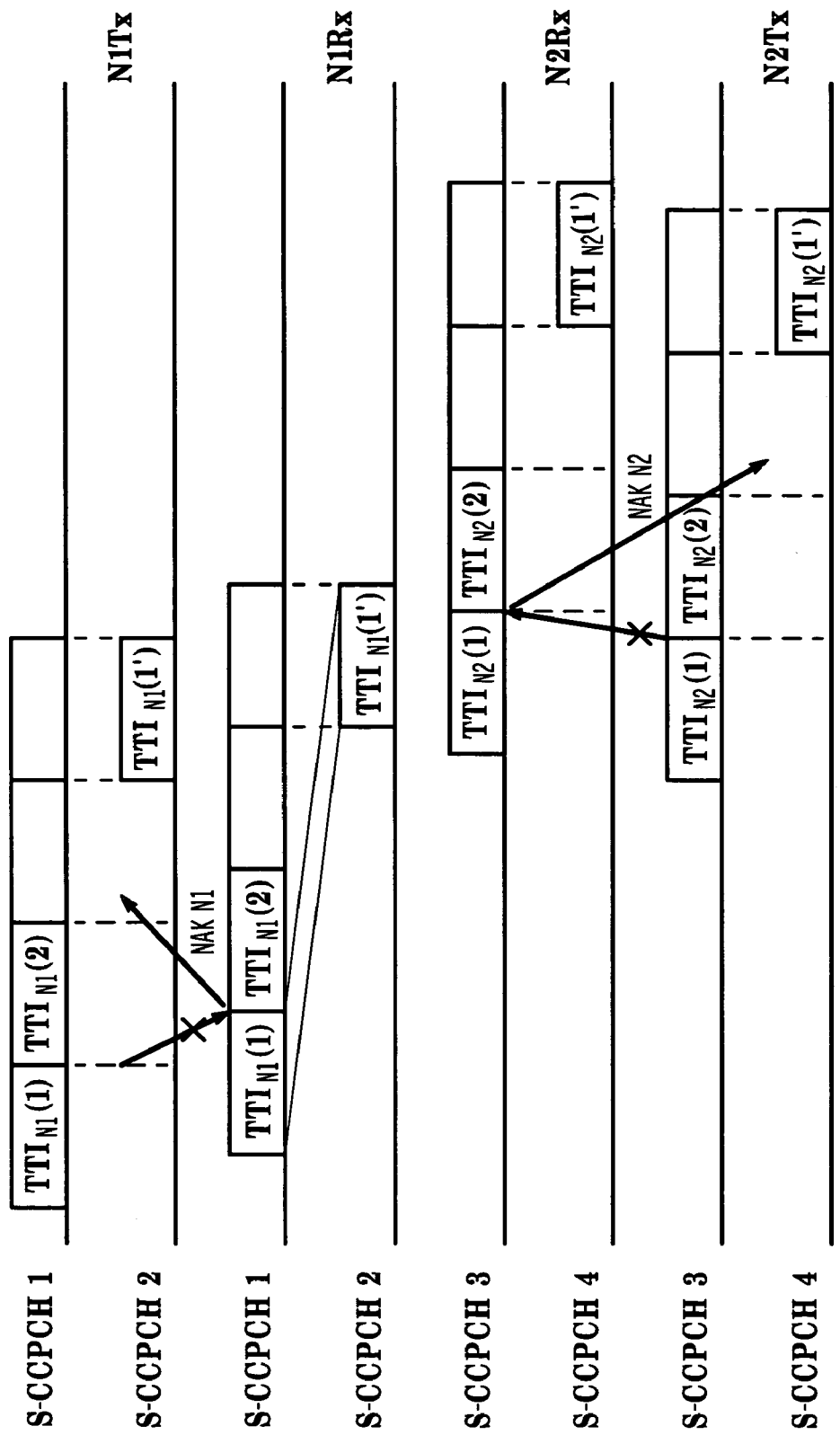
FIG. 6 is a timing diagram depicting retransmissions when transmissions from two cells, specifically corresponding base stations, are negatively acknowledged.

FIG. 6 shows an example 600 when $CPICH_{N1} > CPICH_{N2} + \Delta$, and when the UE is unable to receive from N1 correctly and requests a retransmission. The combined transmissions from N1 are still not decodable and the UE attempts to receive the second cell.

Case 2:

Second we assume that the transmissions from different cells are synchronized well, and the TTIs from base station or cell 1 (N1) arrive at the UE earlier and TTIs from cell 2 (N2) arrive only a small multiple of TTIs later. Hence the soft combining is also possible between two different cells as well as for transmissions from a single cell.

UE Method:

Step A: Receive $TTI_{N1}(n)$

Step B: Receive $TTI_{N2}(n)$

Step C: Soft Combine $TTI_{N1}(n)+TTI_{N2}(n)$ and decode

Step D: If CRC of $TTI_{N1}(n)+TTI_{N2}(n)$ fails

```
        If CPICH_N1 > CPICH_N2
            Transmit NAK for N1
            Goto Step E
        Else
            Transmit NAK for N2
            Goto Step G
        End
    Else
        Goto Step I
    End
```

Step E: Receive $TTI_{N1}(n')$

Step F: Soft Combine $TTI_{N1}(n)+TTI_{N2}(n)+TTI_{N1}(n')$ and decode

Step G: Receive $TTI_{N2}(n')$

Step H: Soft Combine $TTI_{N2}(n)+TTI_{N1}(n)+TTI_{N2}(n')$ and decode

Step I: Increment n (i.e. prepare to receive next TTI)

The base station must respond as follows:

Base Station (Node B) Method:
  If N1 receives NAK then it must retransmit $TTI_{N1}$ after a fixed delay on the S-CCPCH reserved for retransmissions
  If N2 receives NAK then it must retransmit $TTI_{N2}$ after a fixed delay on the S-CCPCH reserved for retransmissions FIG. 7 shows an example 700 when $CPICH_{N1} < CPICH_{N2}$, and when the UE is unable to decode the first transmission (after soft combining) correctly and requests a retransmission from N2. Note that in the example 700, only the base station transmissions are depicted, and the UE reception has been omitted to simplify. Note that in the descriptions of CASE 1 and CASE 2 above, the CPICH measurement can be replaced with an equivalent measure of MBMS transmission SNR, or alternatively the CPICH may be used to determine these SNR values. In this case, the SNR values directly replace the CPICH values in the steps shown.

We show the UE 112 using macro diversity in a diagram 800 of FIG. 8. The UE 112 is receiving a certain MBMS service, say service 1. The UE will evaluate the common pilot channel (CPICH) power of nearby cells, which is labeled 'Ior$_1$' and 'Ior$_2$' corresponding to cell$_1$ 802 and cell$_2$ 804. The UE will estimate the SNRs of the MBMS transmissions on the two cells using the CPICH power. If one of the neighboring cells' (e.g., cell 2) CPICH SNR satisfies certain conditions (relative threshold or absolute threshold), and the cell is also broadcasting service 1, the UE should start to listen to cell 2 simultaneously with its serving cell, combining the transmissions from the two cells. (Note that the corresponding radio bearer information can be obtained from the MBMS common channel {MCCH} of cell 2.)

Figure 9:
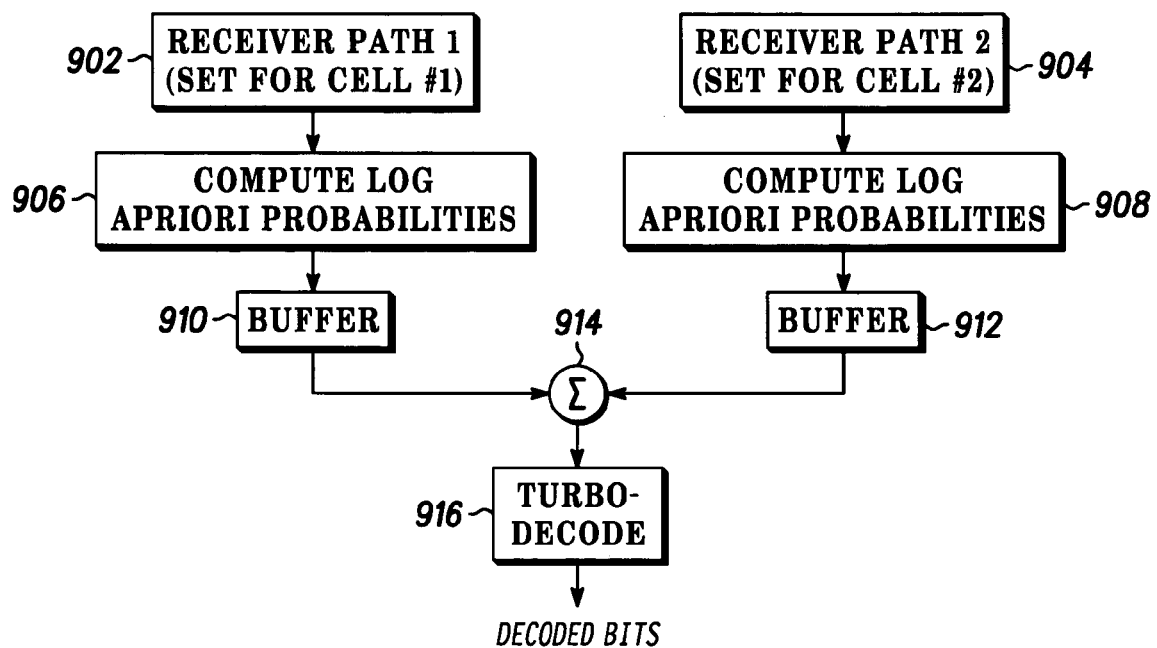
FIG. 9 is a block diagram depicting an architecture for log-likelihood ratio (LLR) combining of primary and diversity transmissions.

FIG. 9 depicts the receiver operation, when soft combining of two cells is used. The receive combining operation is similar to that used for hybrid ARQ combining in 3GPP high speed downlink packet access (HSDPA), and so HSDPA capable mobiles should already (or be easily modified to) support these operations. The UE receives the data from the two cells independently, with the receive paths 902, 904 set to match the physical channel parameters used on the cells.

The receive functions first determine when a channel of interest is being transmitted on a cell (since the channel may be time multiplexed) either by fixed scheduling or through reading an indicator of the data being transmitted (such as the transport format combination indication {TFCI} used in 3GPP). The receiver extracts the transmitted symbols of interest, ultimately producing a priori probability estimates 906, 908 (Pr(n-th bit=i)=$p_i$(n), i=0,1) of the channel bits. These probabilities are used to compute log-likelihood ratios (LLRs) as usual, as $$\Lambda(n) = \log\left(\frac{p_1(n)}{p_0(n)}\right)$$

and stored in buffers 910, 912 (since this simplifies combining and turbo decoding). When both cells are transmitting, their received LLRs are time aligned (using the buffers 910, 912), and then summed together in a summer 914, the output of which is sent to a turbo-decode element 916 to produce decoded bits. Note that FIG. 9 is also applicable when soft combining is applied to a single cell. In this case, receive path 2 904 is set for cell #1, and buffers 910 and 912 time align the LLRs corresponding to the same information bits so that they may be added in summer 914.

It is noted that the use of buffering and channel bit probability combining advantageously allows the primary and diversity branches to have a relative delay of multiple transport blocks. This can be contrasted with MRC of diversity branches using a Rake receiver, which requires a much more stringent relative delay on the order of symbols.

Information Block Identification

Different diversity branches may have independent multiplexing and scheduling, and so the same information bits from information stream 106 may not be available simultaneously on the diversity branches. (There are other causes such as delay jitter in the fixed network that may also cause different information bits to be transmitted on the diversity branches.) Therefore, when the same information bits are transmitted at different times, the UE needs to identify when the same information bits from the information stream are present on the branches. When a dynamic indication of identity that uses TFCI is employed, the UE determines the presence of a transport channel from the TFCI. In the preferred embodiment, a single logical channel carrying information stream 106 is mapped onto the transport channel, and therefore the UE knows when information stream 106 is present. However, the TFCI does not indicate higher layer sequence numbers, and so does not provide a direct indication of the presence of a particular set of information bits in information stream 106. In the preferred embodiment, the UE determines which information bits are transmitted by counting the transport blocks transmitted on each diversity branches. In this way, the UE knows which information bits are being transmitted from information stream 106 on the diversity branches.

The UE may occasionally incorrectly decode a TFCI on a diversity branch, and so may have an incorrect count of information bits transmitted, which will cause it to not know which information bits are being transmitted from information stream 106. Therefore, in the preferred embodiment the controller transmits a synchronization indication of the information stream or specifically transmits a distinct TFCI once out of every L transmissions for synchronization purposes. The distinct TFCI serves the normal purpose of identifying the transport format combination, but also indicates that L transport blocks on the transport channel have been transmitted. The UE upon receiving the distinct TFCI rounds its counter of transport blocks up to the nearest multiple of L, correcting any loss of synchronization that occurs when TFCI are incorrectly decoded.

Synchronization Consideration:

The shared packet data convergence protocol (PDCP) entity will provide the common radio link control (RLC) service data unit (SDU) to the RLC entity in the serving cell and the target cell. If we assume that the target cell and serving cell have the same radio resource allocated to the MBMS service, the following three delay components can be observed:

Medium access control (MAC) processing delay: This is the needed time for MAC entity to make transport blocks and encapsulate them into a data frame of the forward access channel (FACH). We assume 5 msec of radio network controller (RNC) processing delay, and MAC processing delay would be less than that.

Iub delay: This is the delay from a moment a transport block is put into the Iub interface to the moment the transport block arrives at the concerned cell.

Node B processing delay: This is the needed time for a transport block to be processed and placed over the air. We assume this delay as 2 msec.

The observed delay is about 7 ms+Iub delay+air propagation delay (negligible). In our LLR combining solution, multiple TTI time offset (delay) can be tolerable. Based on the soft buffer size, 6400 information bits for 384 kbps UE class, there is 100 ms offset tolerance; or 3840 information bits for 128 kbps UE class, there is 60 ms time offset delay. If the HSDPA buffer can be re-utilized for the LLR combining, more soft buffer is available, and therefore more tolerable time offset can be observed. Hence, from the point of view of the UE's buffer size and the network synchronization, LLR combining is practical.

CONCLUSION

A general adaptive method to provide diverse transmission of information to multiple users simultaneously has been described and disclosed. The method supports both time and macro diversity, and adapts depending on UE memory and network synchronization capability. This adaptation principally takes the form of one or more of: selecting a number of symbols on a diversity transmission in a predetermined time period and selectively transmitting information from bits from one information stream, or retransmitting information blocks based on UE requests. Thus, it should be clear from the preceding disclosure that the present invention provides an apparatus for adapting a diversity transmission mode in a wireless data communication system. The apparatus advantageously can provide diversity gain, matching the performance of MRC when possible, and trades delay constraints for performance gain.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A controller for adapting a diversity transmission mode to provide point-to-multipoint transmission diversity of packet data derived from an information stream in a fixed network of a wireless data communication system, the controller comprising:
at least one communication interface for receiving the information stream and for communicating with a base station of the communication system; and
a processor coupled to the at least one communication interface for processing the information stream and for controlling the base station;
wherein the processor is programmed to transmit an indication that a diversity transmission of the information stream is available; and
wherein, when predetermined capabilities of a user equipment (UE) and the fixed network are sufficient to allow soft combining of a primary transmission and a diversity transmission of bits of the information stream in the UE, the processor is further programmed to:
transmit the primary and diversity transmissions in a manner that facilitates soft combining in the UE, and
transmit a group identity of the information stream to indicate that the information stream is in the primary and diversity transmissions.

2. The controller of claim 1, wherein, when transmitting the primary and diversity transmissions in a manner that facilitates soft combining in the UE, the processor is further programmed to:
determine a primary encoded symbol block from a first set of information bits, and a diversity encoded symbol block only from the first set of information bits, wherein the primary encoded symbol block and the diversity encoded symbol block comprise a number of symbols less than a maximum number of symbols in a predetermined time period; and
transmit the primary and diversity encoded symbol blocks in the primary and diversity transmissions, respectively.

3. The controller of claim 1, wherein, when predetermined capabilities of the UE and the fixed network are not sufficient to allow soft combining of the primary and diversity transmissions in the UE, the processor is further programmed to:
transmit the primary and diversity transmissions in a manner that facilitates selection combining, but not necessarily soft combining, in the UE;
determine primary and diversity encoded symbol blocks from the information stream, the diversity encoded symbol block allowed to include bits different from those of the primary encoded symbol block; and
transmit the primary and diversity encoded symbol blocks in the primary and diversity transmissions, respectively.

4. The controller of claim 1, wherein the processor is further programmed to transmit an indication of a maximum number of symbols to be sent in a predetermined time period.

5. The controller of claim 1, wherein the processor is further programmed to transmit an indication of a maximum delay between transmissions on the primary and diversity transmissions.

6. The controller of claim 1, wherein the processor is further programmed to concurrently transmit the group identity of the information stream along with a first encoded symbol block to produce a dynamic identity indication.

7. The controller of claim 6, wherein the processor is further programmed to transmit a synchronization indication of the information stream.

8. The controller of claim 1, wherein the processor is further programmed to separately transmit the group identity of the information stream and a first encoded symbol block to produce a static identity indication.

9. The controller of claim 1, wherein the processor is further programmed to transmit the diversity transmission in response to receiving a group negative acknowledgement (NAK) from at least one UE.

10. The controller of claim 1, wherein the processor is further programmed to transmit the diversity transmission during a predetermined time interval known to both the UE and the fixed network.

11. The controller of claim 1, wherein the processor is further programmed to adjust a transmit power of at least one of the primary transmission and the diversity transmission in response to receiving a group negative acknowledgement (NAK).

12. The controller of claim 1, wherein the processor is further programmed to transmit the diversity transmission from a cell different from the cell transmitting the primary transmission.

13. The controller of claim 1, wherein the processor is further programmed to identify from the group NAK a cell for which the group NAK is intended.

14. A controller for adapting a diversity transmission mode to provide point-to-multipoint transmission diversity of packet data derived from an information stream in a fixed network of a wireless data communication system, the controller comprising:
at least one communication interface for receiving the information stream and for communicating with a base station of the communication system; and
a processor coupled to the at least one communication interface for processing the information stream and for controlling the base station;
wherein the processor is programmed to cooperate with the base station to:
indicate that a diversity transmission of the information stream is available;
determine a primary and a diversity encoded symbol block from an information block of the information stream;
transmit the primary encoded symbol block on a primary channel; and
transmit the diversity encoded symbol block on a diversity channel in response to receiving a group negative acknowledgement (NAK) from at least one user equipment (UE).

15. The controller of claim 14, wherein the processor is further programmed to transmit the diversity encoded symbol block during a predetermined time interval known to both the UE and the fixed network.

16. The controller of claim 14, wherein the processor is further programmed to adjust a transmit power of at least one of the primary channel and the diversity channel in response to receiving a group negative acknowledgement (NAK) from at least one UE.

17. The controller of claim 14, wherein the processor is further programmed to transmit an indication of a maximum number of symbols to be transmitted in the diversity transmission.

18. The controller of claim 14, wherein the processor is further programmed to transmit a group identity of the primary and diversity channels.

19. The controller of claim 14, wherein the processor is further programmed to:
select a maximum number of symbols to be transmitted on the diversity transmission in a predetermined time period;
determine information bits in the primary and diversity encoded symbol blocks, using identical information bits from the information stream, wherein the information stream has an identity;
ensure that the diversity transmission contains no more than the maximum number of symbols; and
transmit the identity of the information stream on the primary and diversity channels.

20. A wireless user equipment (UE) for adapting a diversity reception mode to receive point-to-multipoint transmission diversity of packet data derived from an information stream in a fixed network of a wireless communication system, the UE comprising:
a transceiver for communicating with the fixed network; and
a processor coupled to the transceiver for controlling the transceiver,
wherein the processor is programmed to cooperate with the transceiver to:
receive a group identity of the information stream; and
when the fixed network encodes a primary symbol block in a primary transmission from a first set of information bits and also encodes a diversity symbol block in a diversity transmission from the first set of information bits, wherein the diversity symbol block comprises a number of symbols less than a predetermined maximum number of symbols in a predetermined time period,
receive, combine, and decode the primary and diversity symbol blocks to produce a decoded received information block; and,
when the fixed network performs one of:
(a) transmitting a number of symbols greater than the predetermined maximum number of symbols in the diversity symbol block in the predetermined time period; and
(b) determining the primary transmission from a second set of information bits different from the first set of information bits;
receive, select, and decode the primary and diversity symbol blocks to produce a decoded received information block.

21. The UE of claim 20, wherein the processor is further programmed to receive the group identity of the information stream concurrently with the primary transmission and with the diversity transmission to produce a dynamic identity indication.

22. The UE of claim 20, wherein the processor is further programmed to receive the group identity of the information stream separately from the primary and diversity transmissions to produce a static indication of identity.

23. The UE of claim 20, wherein the processor is further programmed to receive the primary and diversity transmissions from a first cell and a second cell, respectively.

24. The UE of claim 20, wherein the processor is further programmed to receive the primary and diversity transmissions at first and second time intervals.

25. The UE of claim 20, wherein the processor is further programmed to receive an indication from the fixed network that the primary and diversity transmissions will be transmitted to facilitate combining of the primary and diversity transmissions.

26. The UE of claim 20, wherein the processor is further programmed to receive a message from the fixed network that indicates an amount of delay between the primary and diversity transmissions.

27. The UE of claim 20, wherein the processor is further programmed to determine a delay between the primary and diversity transmissions.

28. A wireless user equipment (UE) for adapting a diversity reception mode to receive a point-to-multipoint diversity transmission of packet data derived from an information stream in a fixed network of a wireless communication system, the UE comprising:
a transceiver for communicating with the fixed network; and
a processor coupled to the transceiver for controlling the transceiver;
wherein the processor is programmed to cooperate with the transceiver to:
receive an indication that a diversity transmission of the information stream is available;
thereafter, receive a primary transmission on a primary channel;
transmit a group negative acknowledgement (NAK) at a predetermined time on a predetermined reverse channel in response to receiving the primary transmission; and
thereafter, receive the diversity transmission on a predetermined diversity channel.

29. The UE of claim 28, wherein the processor is further programmed to receive the diversity transmission during a predetermined time interval known to both the UE and the fixed network.

30. The UE of claim 28, wherein the processor is further programmed to receive the primary and diversity channels during first and second time intervals from a first cell, and to receive a second diversity channel from a second cell.

31. The UE of claim 28, wherein the processor is further programmed to transmit the NAK upon a physical random access channel (PRACH).

32. The UE of claim 28,
wherein the primary channel is transmitted from a first cell, and the predetermined diversity channel is transmitted from one of the first cell and a second cell, and
wherein the processor is further programmed to selectively encode the NAK for reception by one of the first and second cells.

33. The UE of claim 32, wherein the processor is further programmed to selectively encode the NAK in response to a first and a second measurement of signal power, the first measurement made on the first cell, and the second measurement made on the second cell.

* * * * *

UNITED STATES PATENT AND TRADEMARK OFFICE
CERTIFICATE OF CORRECTION

PATENT NO. : 7,058,407 B2 Page 1 of 1
APPLICATION NO. : 10/835971
DATED : June 6, 2006
INVENTOR(S) : Zhijun Cai, Colin G. Dunlop and Joseph C. Sligo It is certified that error appears in the above-identified patent and that said Letters Patent is hereby corrected as shown below:

Please Insert item [76],
Delete the name of the first named inventor "Zhijun Chi" and replace with the corrected name of the first named inventor, --Zhijun Cai--.

Signed and Sealed this

Fifth Day of December, 2006

JON W. DUDAS
*Director of the United States Patent and Trademark Office*